United States Patent
Brown et al.

(10) Patent No.: US 8,333,898 B2
(45) Date of Patent: Dec. 18, 2012

(54) METHOD FOR MANUFACTURING A MAGNETIC TAPE HEAD USING A TMR SENSOR

(75) Inventors: Diane L. Brown, San Jose, CA (US); Quang Le, San Jose, CA (US); Chang-Man Park, Mountain View, CA (US); David J. Seagle, Morgan Hill, CA (US); Eileen Yan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 193 days.

(21) Appl. No.: 12/973,791

(22) Filed: Dec. 20, 2010

(65) Prior Publication Data
US 2012/0152891 A1 Jun. 21, 2012

(51) Int. Cl.
*B44C 1/22* (2006.01)
(52) U.S. Cl. .......................................................... 216/22
(58) Field of Classification Search .................... 216/22; 438/3
See application file for complete search history.

(56) References Cited

U.S. PATENT DOCUMENTS

| | | | |
|---|---|---|---|
| 5,855,056 A | 1/1999 | Cates | |
| 6,271,998 B1 | 8/2001 | Coehoom et al. | |
| 6,344,951 B1 | 2/2002 | Sato et al. | |
| 6,506,534 B1 | 1/2003 | Nozaki et al. | |
| 6,704,178 B2 | 3/2004 | Nakashio et al. | |
| 7,172,848 B2 | 2/2007 | Shimbori | |
| 7,192,676 B2 | 3/2007 | Kagotani et al. | |
| 7,591,064 B2 | 9/2009 | McFadyen | |
| 7,605,006 B2 | 10/2009 | Morijiri et al. | |
| 2004/0090705 A1 | 5/2004 | Kikuiri | |
| 2004/0261253 A1* | 12/2004 | Yin et al. | 29/603.01 |
| 2006/0034021 A1 | 2/2006 | Wu | |
| 2007/0091505 A1 | 4/2007 | Koeppe | |
| 2008/0291583 A1 | 11/2008 | Tanaka et al. | |
| 2009/0128954 A1 | 5/2009 | Lau | |

OTHER PUBLICATIONS

Stern et al., "Process for Making Interleaved Magnetic Head," IBM Technical Disclosure Bulletin, Oct. 1992, p. 1-2.

* cited by examiner

*Primary Examiner* — Roberts Culbert
(74) *Attorney, Agent, or Firm* — Zilka-Kotab, PC

(57) ABSTRACT

A method for manufacturing a magnetic tape head having a data sensor and a servo sensor. The data sensor and servo sensor are each separated from first and second magnetic shields by a non-magnetic gap layer, and the gap thickness for the servo sensor is larger than the gap thickness for the data sensor. The method involves depositing a first gap layer over shield structures, then depositing a second gap layer using a liftoff process to remove the second gap layer over the data sensor region. A plurality of sensor layers are then deposited, and a stripe height defining mask structure is formed over the data and servo sensor regions, the mask having a back edge that is configured to define a stripe height of the data and servo sensors. An ion milling is then performed to define the stripe height and to remove gap material from the field.

21 Claims, 17 Drawing Sheets

METHOD FOR MANUFACTURING A MAGNETIC TAPE HEAD USING A TMR SENSOR

FIELD OF THE INVENTION

Embodiments of the present invention generally relate to tape modules used for magnetic recording on tapes, and more specifically to fabrication of servo and data head structures of a tape module.

BACKGROUND OF THE INVENTION

Tape modules are used to record information on tapes by magnetic processes. The tape modules use servo heads to read servo tracks to align the heads for reading data stored on data tracks. The servo heads and data heads are typically formed using a sensor disposed between two shield layers and directly contacting the two shield layers. However, current servo and data head designs do not provide adequate readback in newer tape designs that require higher data densities as well as different servo track and data track densities. Additionally, the industry is moving to a tunneling magnetoresistive (TMR) sensor, which has a read gap defined by the TMR film. With current tape densities, a wider read gap is needed in both the data and servo heads, and additionally, the respective gaps must be unique to one another.

It is desirable to provide new head structures and processes for forming the same that allow for achieving higher recording area density than is currently available for tape modules.

SUMMARY OF THE INVENTION

The present invention provides a method for manufacturing a magnetic tape head having a data sensor and a servo sensor. The data sensor and servo sensor are each separated from first and second magnetic shields by a non-magnetic gap layer, and the gap thickness for the servo sensor is larger than the gap thickness for the data sensor. The method involves depositing a first gap layer over shield structures, then depositing a second gap layer using a liftoff process to remove the second gap layer over the data sensor region. A plurality of sensor layers are then deposited, and a stripe height defining mask structure is formed over the data and servo sensor regions, the mask having a back edge that is configured to define a stripe height of the data and servo sensors. An ion milling is then performed to define the stripe height and to remove gap material from the field.

Because the ion milling defines the stripe height and also removes the first and second gap layers from the field region, there is no need for a second masking and milling operation to remove these gap layers in the field. This saves considerable time and expense in the manufacture of the tape head.

After the stripe height has been defined another masking and milling operation can be performed to define the track width of the sensor. An insulation layer and hard magnetic material layer can then be deposited and a CMP performed.

A third gap layer can be deposited, followed by a fourth gap layer deposited using a liftoff process so that the fourth gap layer is in the servo sensor region, but not the data sensor region.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
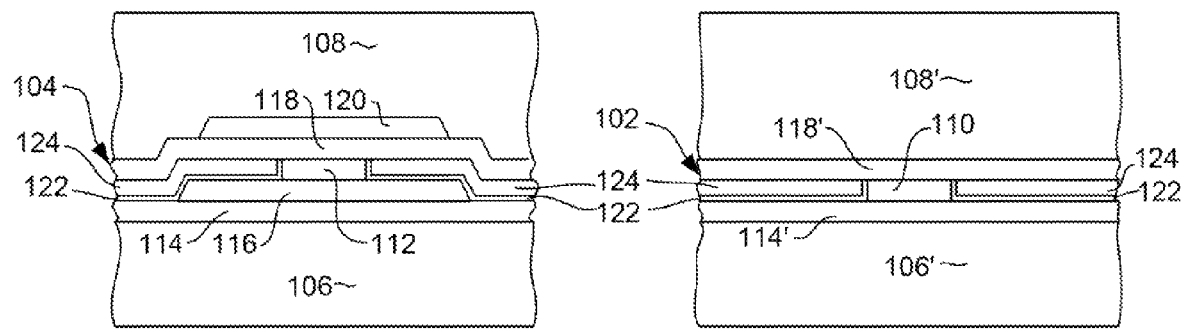
FIG. 1 is a cross sectional ABS of a magnetic data read sensor and a magnetic servo read sensor.

FIG. 1 shows an ABS view of a data read head 102 and a servo read head 104 both for use in a magnetic tape drive data recording system. In a tape drive system, a data head 102 and servo head 104 are both necessary, and are configure laterally aside one another on a common slider. In a tape drive system the desired read gap (i.e. shield to shield spacing) of a read head is determined by the magnetic spacing of the linear density, media thickness and spacing. If the gap is too large, there will be no high frequency signal. If it is too small, there will be a low overall signal. The optimal gap thickness for a typical tape drive is about 5 times that of a read head in a magnetic disk drive system.

With continued reference to FIG. 1, the data read head 102 and servo read head 104 are each sandwiched between common lower and upper electrically conductive magnetic shields 106, 108, which can be constructed of a material such as NiFe or CoFe. The data read head and servo read head each include a magnetoresistive sensor 110, 112, which is preferably a tunnel junction magnetoresistive sensor that could include a free layer structure, pinned layer structure and a non-magnetic, electrically insulating barrier layer sandwiched there-between. The pinned layer structure, free layer structure and barrier layer are not shown for purposes of clarity, but are represented generally as the sensors 110, 112.

As can be seen, the sensor 112 of the servo read head 104 is sandwiched between four read gap layers whereas the sensor 110 of the data read head 102 is sandwiched between only two gap layers 114', 118'. The servo read head 104 includes a non-magnetic, electrically conductive first gap layer 114 and a non-magnetic, electrically conductive second gap layer 116, both of which are located beneath the sensor 112, separating the sensor 112 from the lower shield 106. The servo read head 104 further includes a third non-magnetic, electrically conductive gap layer 118, and a fourth non-magnetic, electrically conductive gap layer 120, both of which are located above the sensor 112 so as to separate the sensor 112 from the upper shield 108. All of the shields 114, 116, 118, 120 can be constructed of NiCr. The first and fourth gap layers 114, 120 can have a thickness of 700-900 Angstroms, or about 800 Angstroms. The second and third gap layers 116, 118 can have a thickness of 400-500 Angstroms, or about 450 Angstroms.

Whereas the servo read head 104 has four gap layers 114, 116, 118, 120, the data read head 102 has only two gap layers 114' and 118'. The gap layer 114' is beneath the sensor 110 and separates the sensor 110 from the lower shield 106'. The gap layer 118' is located above the sensor 110 and separates the sensor 110 from the upper shield 108'. It can be seen, that the gap layers 114', 118' of the data head 102 have the same designation as the gap layers 116, 118 of the servo head 104, except for the addition of a prime designator (') This designation (') indicates that although functioning as gaps for the data head 102, these gap layers 114', 118' are essentially the same common layer as the layer 116, 118. This will become clearer below wherein a method for manufacturing a sensor according to an embodiment of the invention is described. Therefore, like the layers 114, 118, the gap layers 114', 118' can be constructed of NiCr and can have a thickness of 400-500 Angstroms or about 450 Angstroms. While NiCr is a preferred material, the gap layers 114, 116, 116', 118, 118', 120 can also be constructed of Ta, NiCr, NiP, Cr, Ru or Ir. Also, the gap layers 114, 114', 116, 118, 118', 120 need not all be the same material and can be different materials selected from those listed above.

Each of the read heads 102, 104 also includes thin insulation layers 122, and hard bias layers 124 formed at either side of the sensors 110, 112. The hard bias layers 124 provide a magnetic bias field for biasing the magnetization of the free layer (not shown) of the sensors 110, 112, and the insulation layers 122 prevent sense current from being shunted across the hard bias layers 124. The insulation layers 122 can be constructed of alumina, and the hard bias 124 layers can be a high magnetic moment material such as CoPt or CoPtCr.

Therefore, it can be seen, that the structure of FIG. 1 provides a data read head and a servo read head that can be formed side by side on a common slider and wherein the servo read head 104 can be formed with a lager gap thickness than the data read head 102, as is needed in a tape drive system. What's more, the gap layers 114, 114', 116, 118, 118', 120 are non-magnetic and electrically conductive, making them suitable for use in read and write heads 102, 104 that employ current perpendicular to plane TMR sensors.

Figure 2:
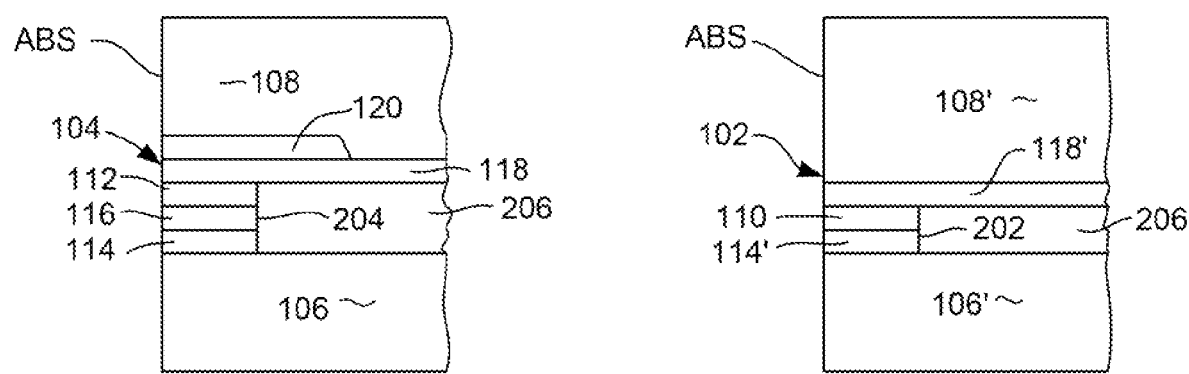
FIG. 2 is a side cross sectional view of the magnetic data read sensor and magnetic servo read sensor of FIG. 1.

FIG. 2 shows a side cross sectional view of the data read head 102 and servo read head 104. In FIG. 2 it can be seen that the data head 102 has a back edge (stripe height) surface 202 that is a common back surface the read sensor 110 as well as the gap layer 114' formed there-under. Similarly, the servo read head 104 has a back edge 204 that extends across the back (stripe height) edge of the sensor 112 as well as the under-lying gap layers 116, 114. A non-magnetic fill layer 206 such as alumina can fill the space between the stripe heights 202, 204 of the sensors 102, 104.

Figure 3:
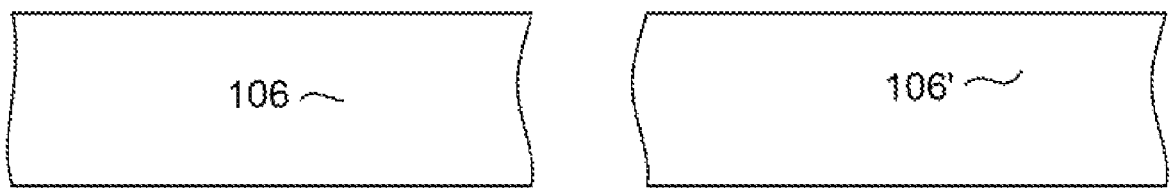
FIGS. 3-17 are various cross sectional views of a magnetic data sensor and a magnetic servo sensor in various intermediate stages of manufacture, illustrating a method of manufacturing a magnetic data and read sensors according to an embodiment of the invention.
Figure 4:
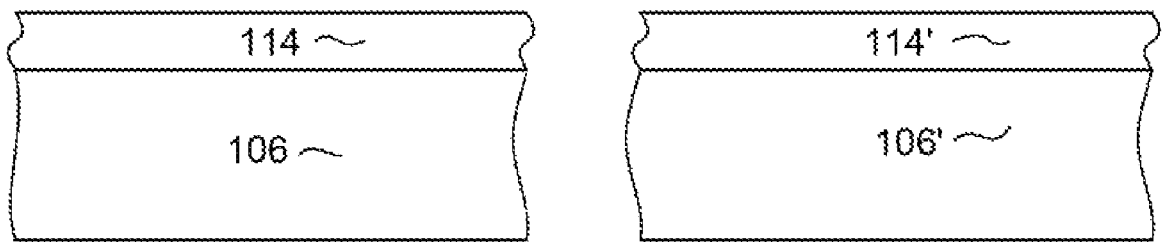

FIGS. 3-17 illustrate a method for manufacturing a magnetic data head 102 and magnetic servo head 104 such as those described above. With particular reference to FIG. 3, shield structures 106, 160' are formed, and preferably planarized by chemical mechanical polishing (CMP). The designations 106 and 106' indicate that, while they are separate shield portions formed in a servo head area and data head area respectively, they are actually formed in a common electroplating process on a common substrate. Then, with reference to FIG. 4, a first gap layer material 114, 114' is deposited over the shield 106, 106'. Again the designators 114, 114' indicate the portions of the gap layer being in servo and data regions, but that they are both deposited as a single layer. The layer 114, 114' is a non-magnetic, electrically conductive material such as NiCr that can be deposited by a deposition process such as sputter deposition or ion beam deposition to a thickness of 700-900 Angstroms or about 800 Angstroms. The layer 114, 114' can also be constructed of Ta, NiP, Cr, Ru or Ir.

As those skilled in the art will appreciate, deposition processes such as sputter deposition deposit material over the entire wafer. Therefore, the material 114, 114' extends everywhere on the wafer. In order to prevent problems such as shorting, and to prevent this metal from being exposed at the outer edges (e.g. ABS) of the slider, this material must be removed in the field (e.g. away from the servo head and data head areas). Ordinarily this would require either a masking and milling operation at this point in the process or a liftoff process during deposition to ensure that none of the material 114, 114' remains in the field. The present invention, however, eliminates this extra step by performing this field removal of 114, 114' later in the process in a combined process step as will be shown below.

Figure 5:
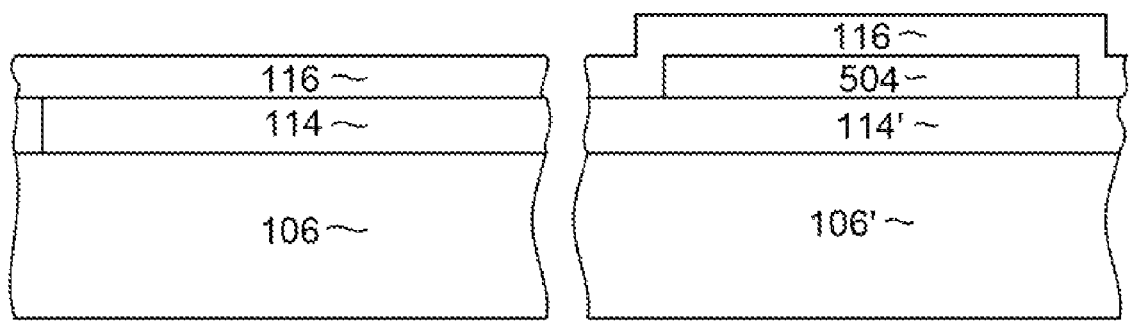
Figure 6:
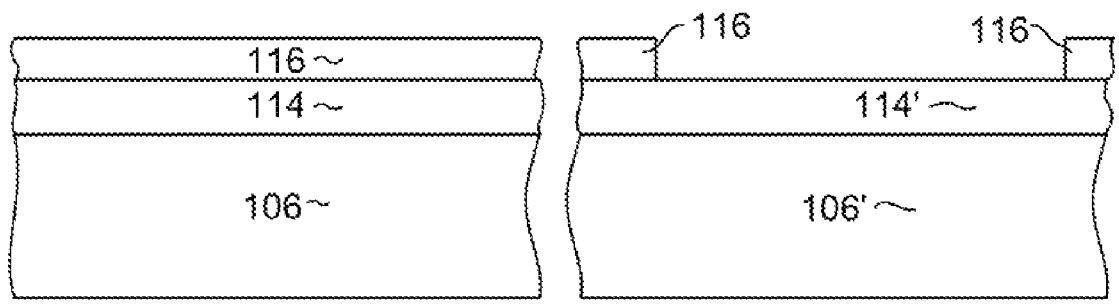

Then, with reference to FIG. 5, a liftoff mask 504 is formed over the data area as shown. This can be a photolithographically patterned photoresist mask, and can be formed as a bi-layer mask to facilitate liftoff. A second gap layer 116 can be deposited over the first gap layer 114, 114', and over the liftoff mask 504. Like the first gap layer, the second gap layer 116 can be NiCr, or can also be constructed of Ta, NiP, Cr, Ru or Ir. The second gap layer 116 can be deposited to a thickness of 400-500 Angstroms or about 450 Angstroms. The mask 504 can then be lifted off, leaving a structure such as that shown in FIG. 6 with no second gap layer 116 in the data head region. An optional $H_2/N_2$ ash cleanup process can be performed after liftoff to remove any remaining fences of gap material 116 at the liftoff site.

Figure 7:
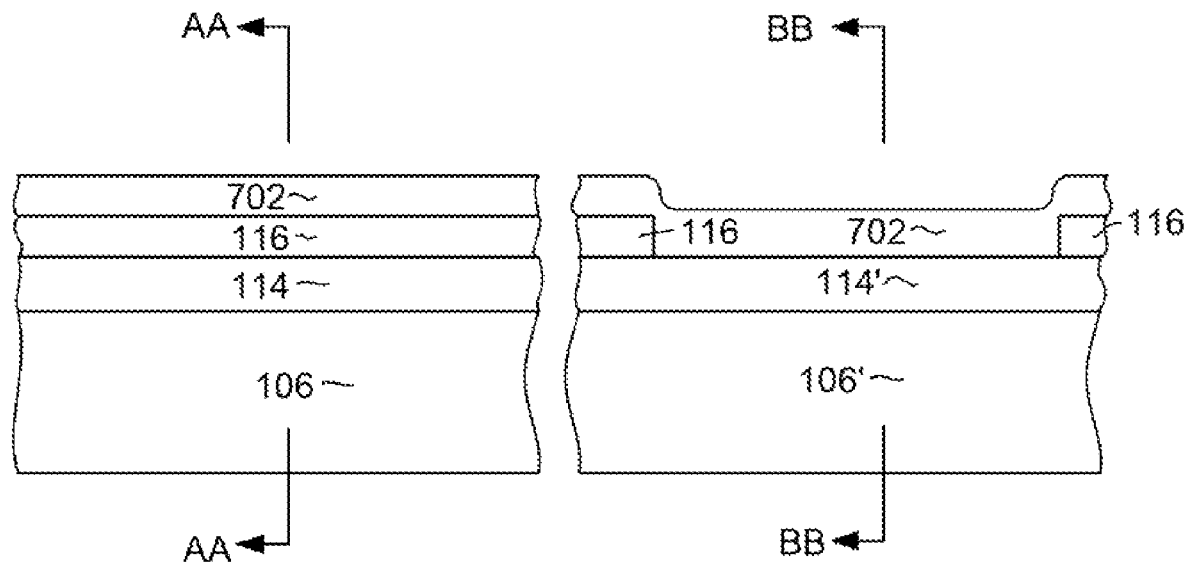

Then, with reference to FIG. 7, a series of sensor layers 702 can be deposited full film. This full film of sensor layers can includes an AFM layer, pinned layer structure barrier layer, free layer and capping layer in addition to other possible layers. The sensor layers 702 are material layers that will make up the sensors 110, 112 discussed above with reference to FIGS. 1 and 2. As can be seen, the sensor layers 702 extend over the second gap layer 116 in the servo region, but extend over the first gap layer 114' in the data gap region.

Figure 8:
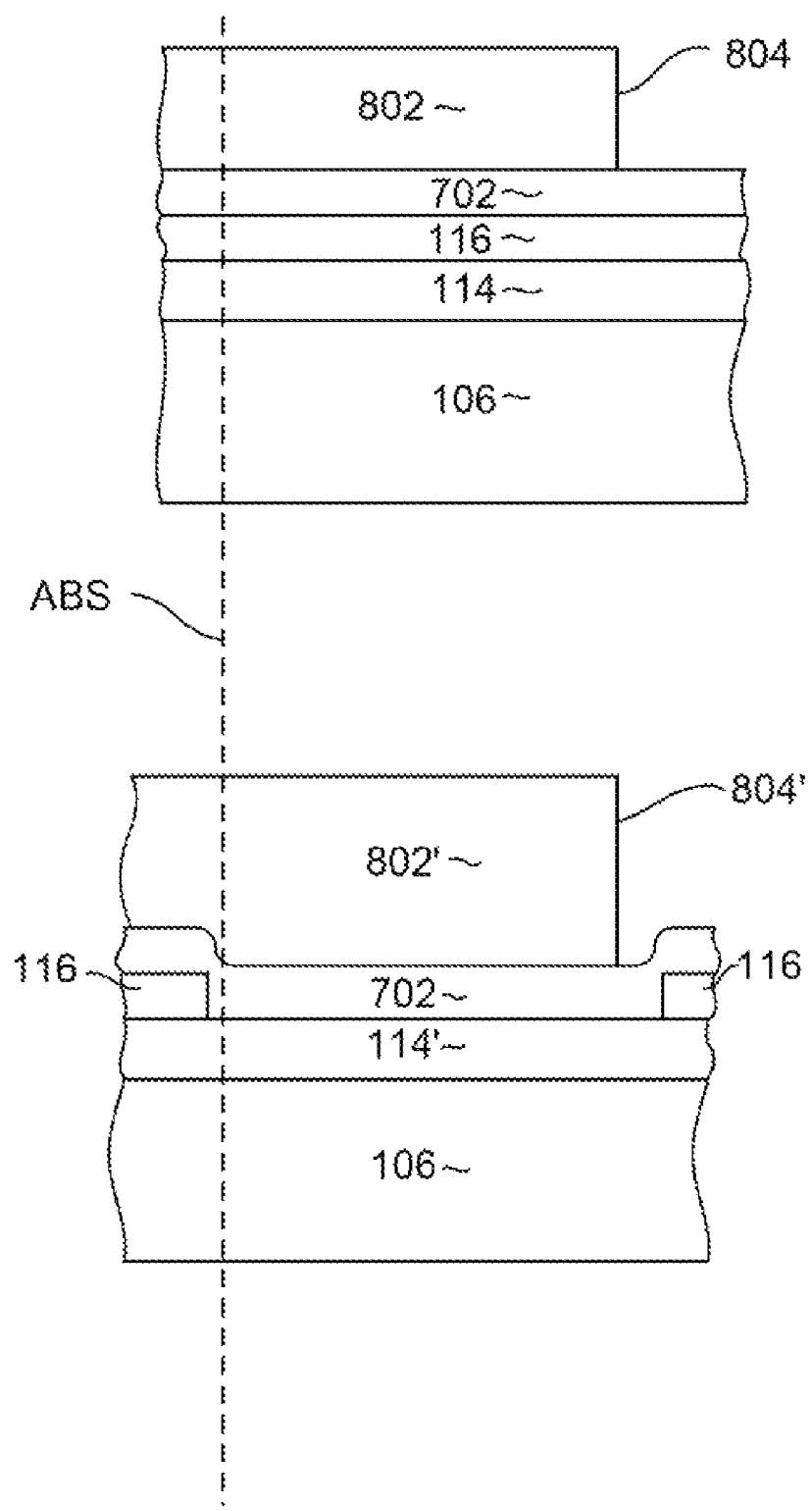

FIG. 8 shows a side cross sectional view, perpendicular to the air bearing surface (ABS) of the structure formed thus far. View AA is taken from line AA-AA of FIG. 7 and view BB is taken from line BB-BB of FIG. 7. As shown in FIG. 8, a mask structure 802 is formed having a back edge 804 that is located a desired distance from the air bearing surface plane designated "ABS". This back edge 804 is configured to define the stripe height of the sensor as will be seen. The mask 802 can be formed by photolithographically patterning a photoresist material. Although, the mask 802 can include other layers as well, such as one or more hard mask layers, an image transfer layer and a bottom antireflective coating (BARC), all of which are not shown here for clarity.

Figure 9:
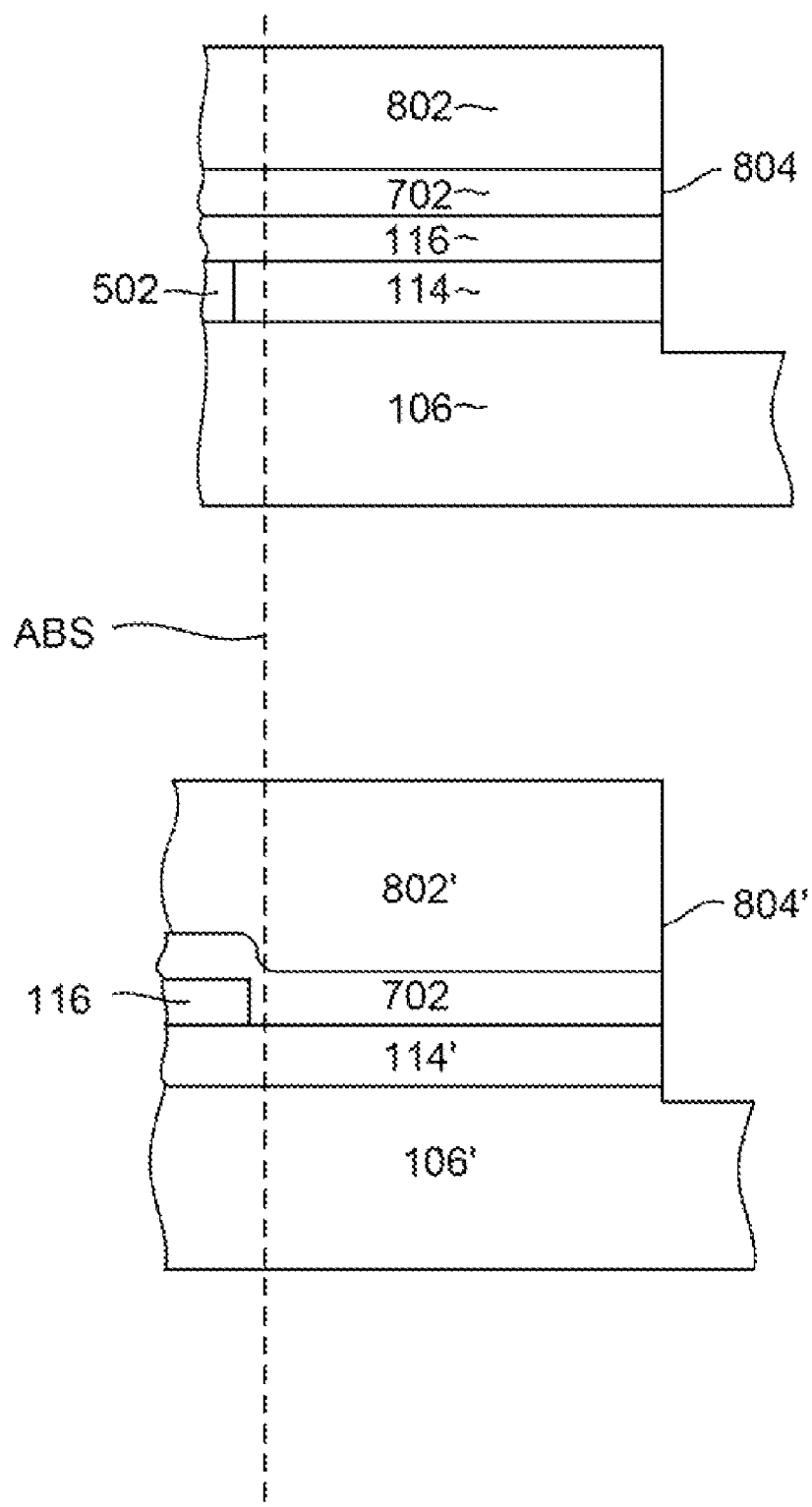

An ion milling is then performed to remove material not protected by the mask 802, leaving a structure as shown in FIG. 9. As can be seen, the ion milling is performed all of the way down to the shield structure 106 so that it removes portions of the gap layers 114,116 that are not protected by the mask 804. It should be pointed out at this point that the mask structure 802, 802' only covers areas around the data and servo sensors, leaving areas in the field (e.g. away from the data and servo sensors) uncovered. Therefore, this removal of the gap layers 114, 114', 116, also removes these gap layers 114, 114', 116 in the field area. In addition, the space between the servo and data sensor areas can be left uncovered as well. Because these gap layers are completely remove in the field, there is no need to remove gap layer 114, 114' in earlier separate steps, such as between the processes of FIGS. 3 and 4. This saves valuable time and cost and simplifies manufacture.

Figure 10:
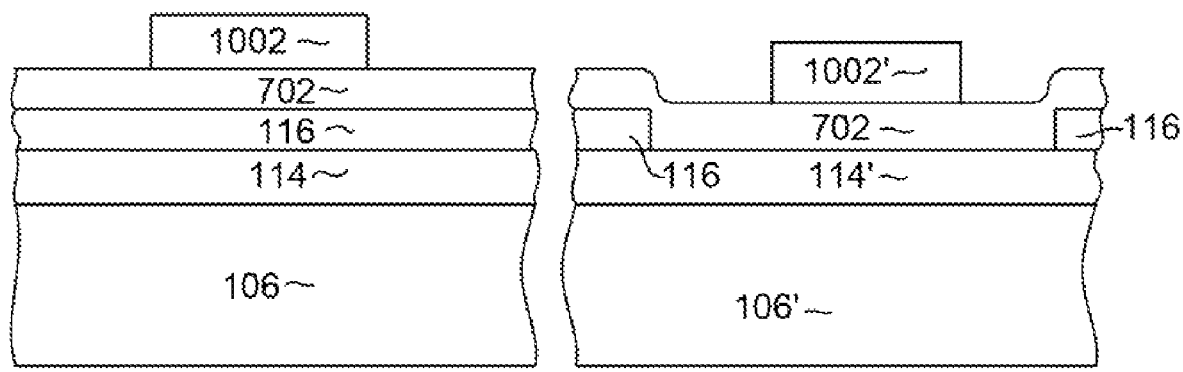

FIG. 10 is a cross sectional view of a plane that is parallel with the ABS plane (designated "ABS" in FIG. 9). In FIG. 10 track-width defining mask structure 1002, 1002' is formed over the servo section and data sections. The mask 1002, 1002' can be a photolithographically patterned photoresist material and can also include other layers such as one or more hard mask layers, an image transfer layer, and a bottom anti-reflective coating (BARC) layer (not shown).

Figure 11:
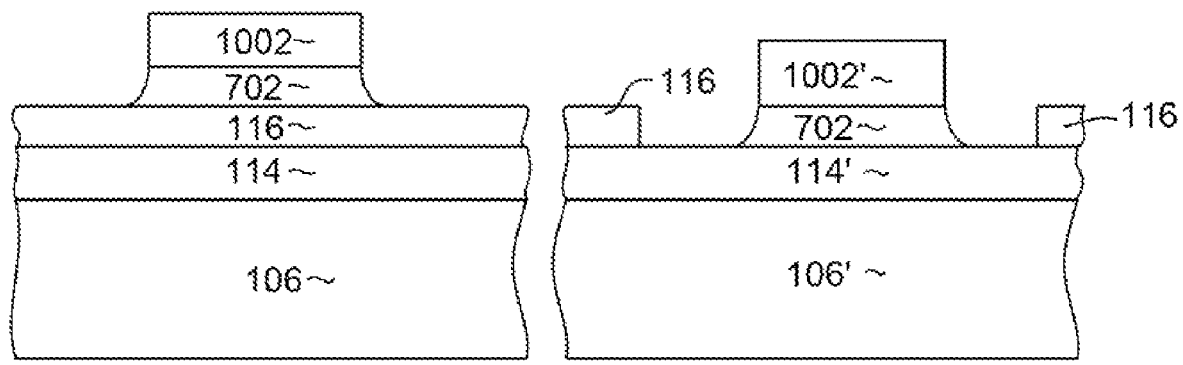

Then, with reference to FIG. 11, a second ion milling is performed, this time to remove material not protected by the mask 1002, 1002' in order to define the track-width of the sensor, in this form, layers 702, 702' correspond to sensors 110, 112 respectively of FIGS. 1 and 2. The ion milling, performed using a 50/30 ion mill condition, will preferably mill into the second gap layer 116 by about 100 Angstroms. This ion milling is preferably performed at one or more angles so as to ensure that no re-deposited material remains at the sides or back edge (stripe height edge) of the sensor material 702.

Figure 12:
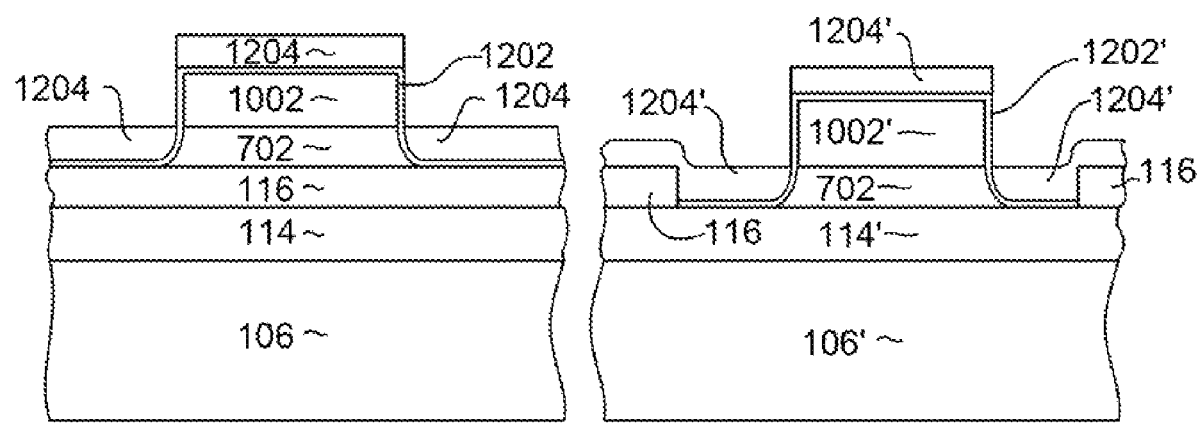
Figure 13:
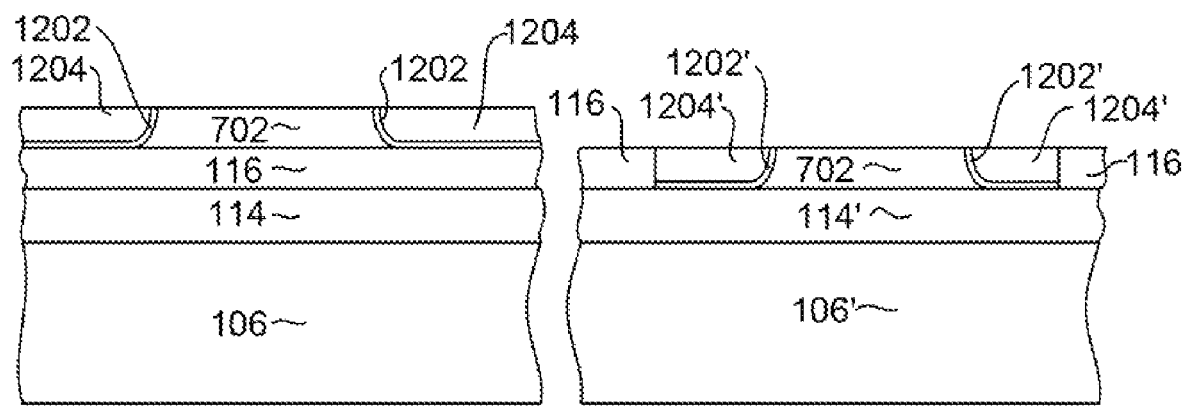

A thin insulation layer 1202 can then be deposited followed by a layer of hard magnetic material 1204, as shown in FIG. 12. The insulation layer 1202 can be alumina which can be deposited by atomic layer deposition (ALD). The hard magnetic material can be CoPt or CoPtCr and can be deposited by sputter deposition or some similar technique. The mask structure 1002, 1002' can be removed by a process that can include chemical mechanical polish (CMP) assisted liftoff or some other suitable method, leaving a structure as shown in FIG. 13.

Figure 14:
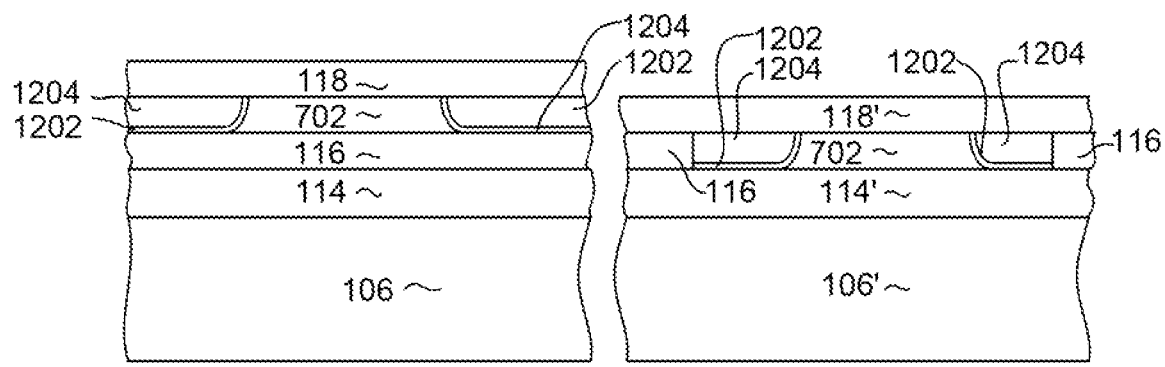
Figure 15:
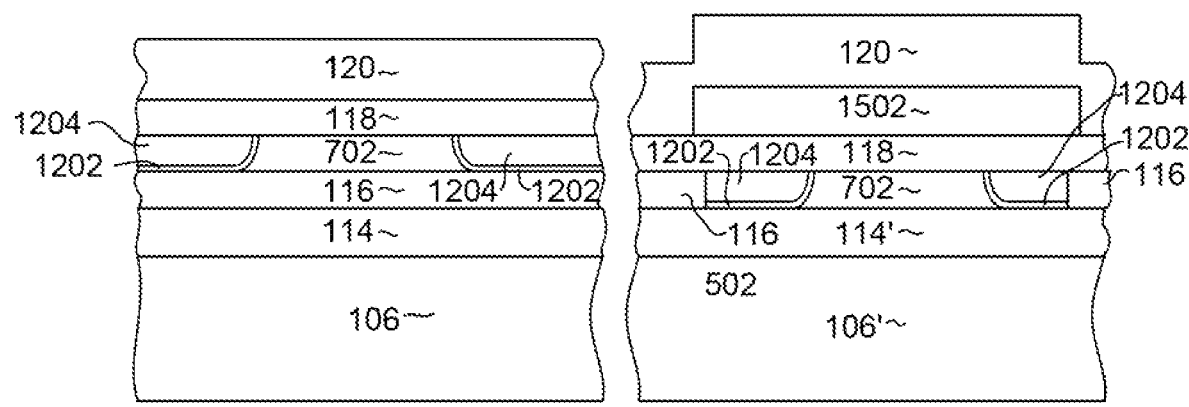
Figure 16:
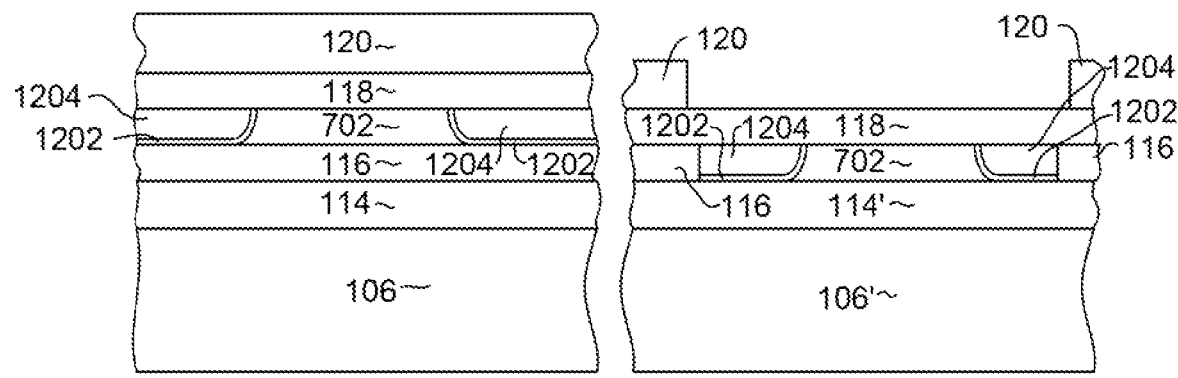

With reference now to FIG. 14, a third gap layer 118, 118' is deposited full film in both the servo and data areas. This third gap layer 118, 118' can be NiCr, Ta, NiP, Cr, Ru or Ir and can be deposited by a process such as sputter deposition or ion beam deposition, preferably to a thickness of 400-500 Angstroms or about 450 Angstroms. Then, with reference to FIG. 15, a liftoff mask 1502 is formed over the data head area and a layer of fourth gap material 120 is deposited. The fourth gap material can be NiCr, Ta, NiP, Cr, Ru or Ir and can be deposited by sputter deposition, ion beam deposition or some similar process to at thickness of 700 to 900 Angstroms or about 800 Angstroms. The liftoff mask 1502 can then be lifted off, leaving a structure as shown in FIG. 16. The liftoff mask 1502 can also be constructed so as to cover areas in the field (outside of the sensor areas) so that liftoff of the mask 1502 removes the gap material 120 in the field.

Figure 17:
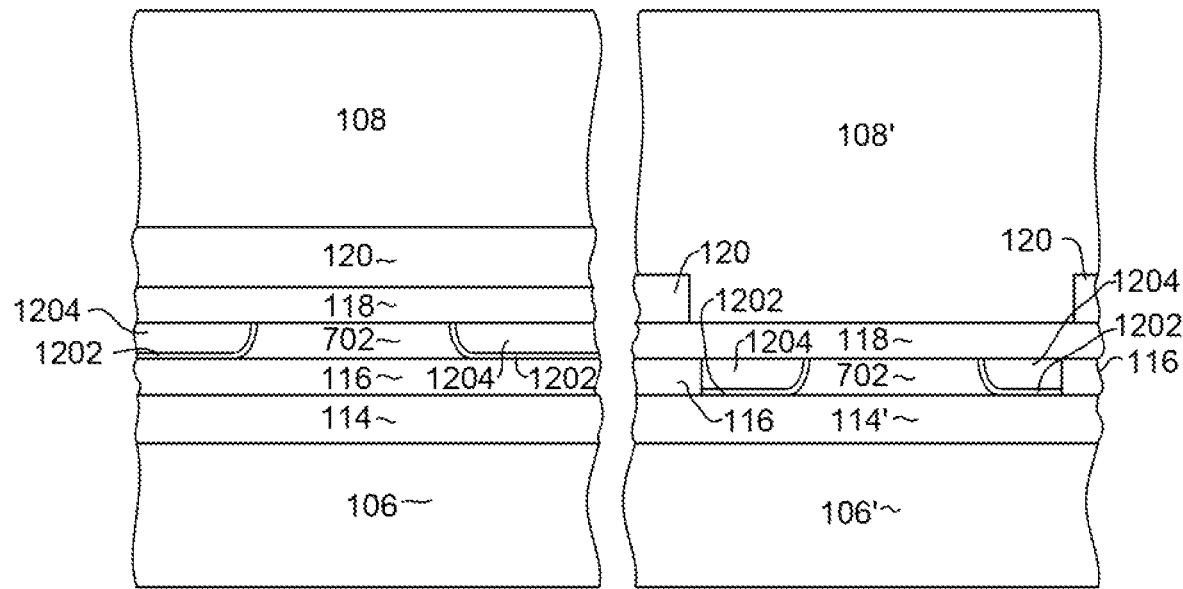

Then, with reference to FIG. 17, magnetic shield structures 108, 108' are formed by constructing an electroplating frame mask (not shown) and electroplating a magnetic material such as NiFe or CoFe.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic tape head, comprising:
    forming a first magnetic, electrically conductive shield in a data sensor region and a second magnetic, electrically conductive shield in a servo sensor region;
    depositing a first non-magnetic gap layer;
    forming a first liftoff mask over the data sensor region;
    depositing a second non-magnetic gap layer;
    removing the first liftoff mask, thereby removing a portion of the second non-magnetic gap layer in the data sensor region;
    depositing a plurality of sensor layers;
    forming a stripe height defining mask structure, the stripe height defining mask structure having a portion in the data sensor region formed with a back edge configured to define a sensor stripe height and having a portion in the servo sensor region also having a back edge configured to define a stripe height, the stripe height defining mask structure leaving regions outside of the data sensor region and outside of the servo sensor region uncovered; and
    performing an ion milling to remove portions of the first and second non-magnetic gap layer and the plurality of sensor layers that are not protected by the stripe height defining mask structure, thereby forming a back edge of a sensor structure in the data sensor region and servo sensor region and also removing the first and second gap layers in a field region outside of the data and servo sensor regions.

2. The method as in claim 1 further comprising, after performing the ion milling:
    forming a track width defining mask structure in the data sensor region and the servo sensor region; and
    performing a second ion milling to remove a portion of the plurality of sensor layers not protected by the track width defining mask structure, thereby defining a sensor track width for a data sensor and for a servo sensor.

3. The method as in claim 2 further comprising, after performing the second ion milling, depositing a thin, non-magnetic, electrically insulating layer, and depositing hard magnetic bias layer.

4. The method as in claim 3, further comprising, after depositing the thin, non-magnetic, electrically insulating layer and the hard magnetic bias layer, performing a chemical mechanical polishing.

5. The method as in claim 1 further comprising after performing the second ion milling:
    depositing a third non-magnetic gap layer;
    forming a second liftoff mask in the data sensor region;
    depositing a fourth non-magnetic gap layer; and
    removing the second liftoff mask thereby removing the fourth non-magnetic gap material from the data sensor region.

6. The method as in claim 3 further comprising after depositing the non-magnetic, electrically insulating layer and the hard magnetic bias layer:
    depositing a third non-magnetic gap layer;
    forming a second liftoff mask in the data sensor region;
    depositing a fourth non-magnetic gap layer; and
    removing the second liftoff mask thereby removing the fourth non-magnetic gap material from the data sensor region.

7. The method as in claim 4 further comprising after performing the chemical mechanical polishing:
    depositing a third non-magnetic gap layer;
    forming a second liftoff mask in the data sensor region;
    depositing a fourth non-magnetic gap layer; and
    removing the second liftoff mask thereby removing the fourth non-magnetic gap material from the data sensor region.

8. The method as in claim 1 wherein the first and second non-magnetic gap layers each comprise an electrically conductive material.

9. The method as in claim 1 wherein the first and second non-magnetic gap layers each comprise NiCr.

10. The method as in claim 1 wherein the first and second non-magnetic gap layers each comprise NiCr, Ta, NiP, Cr, Ru or Ir.

11. The method as in claim 1 wherein the first non-magnetic gap layer has a thickness of 700-900 Angstroms and the second non-magnetic gap layer has a thickness of 400-500 Angstroms.

12. The method as in claim 1 wherein the first non-magnetic gap layer has a thickness of about 800 Angstroms and the second non-magnetic gap layer has a thickness of about 450 Angstroms.

13. The method as in claim 8 wherein the first non-magnetic gap layer has a thickness of 700-900 Angstroms and the second non-magnetic gap layer has a thickness of 400-500 Angstroms.

14. The method as in claim 9 wherein the first non-magnetic gap layer has a thickness of 700-900 Angstroms and the second non-magnetic gap layer has a thickness of 400-500 Angstroms.

15. The method as in claim 10 wherein the first non-magnetic gap layer has a thickness of 700-900 Angstroms and the second non-magnetic gap layer has a thickness of 400-500 Angstroms.

16. The method as in claim 5 wherein the first, second, third and fourth non-magnetic gap layers each comprise an electrically conductive material.

17. The method as in claim 5 wherein the first, second, third and fourth non-magnetic gap layers each comprise NiCr.

18. The method as in claim 5 wherein the first, second, third and fourth non-magnetic gap layers each comprise NiCr, Ta, NiP, Cr, Ru or Ir.

19. The method as in claim 16 wherein the first non-magnetic gap layer has a thickness of 700-900 Angstroms and the second non-magnetic gap layer has a thickness of 400-500 Angstroms.

20. The method as in claim 17 wherein the first non-magnetic gap layer has a thickness of 700-900 Angstroms and the second non-magnetic gap layer has a thickness of 400-500 Angstroms.

21. The method as in claim 18 wherein the first non-magnetic gap layer has a thickness of 700-900 Angstroms and the second non-magnetic gap layer has a thickness of 400-500 Angstroms.

* * * * *